United States Patent

Rolls

[19]

[11] Patent Number: 6,145,787
[45] Date of Patent: Nov. 14, 2000

[54] DEVICE AND METHOD FOR HEATING AND DEICING WIND ENERGY TURBINE BLADES

[75] Inventor: John A. Rolls, Armonk, N.Y.

[73] Assignee: Thermion Systems International, Stratford, Conn.

[21] Appl. No.: 09/082,079

[22] Filed: May 20, 1998

Related U.S. Application Data

[60] Provisional application No. 60/047,237, May 20, 1997.

[51] Int. Cl.⁷ .................................................. B64D 15/00
[52] U.S. Cl. ................................ 244/134 R; 244/134 D; 416/223 R; 416/241 R; 219/635; 219/545; 219/549
[58] Field of Search .......................... 244/134 R, 134 D; 416/223 R, 229 R, 241 R; 219/635, 544, 545, 549

[56] References Cited

U.S. PATENT DOCUMENTS

| | | | |
|---|---|---|---|
| 3,657,516 | 4/1972 | Fujihara | 219/345 |
| 3,859,504 | 1/1975 | Motokawa et al. | 219/345 |
| 4,039,720 | 8/1977 | Cherenko et al. | 428/425 |
| 4,110,151 | 8/1978 | Morse | 156/519 |
| 4,245,149 | 1/1981 | Fairlie | 219/528 |
| 4,250,397 | 2/1981 | Gray et al. | 219/345 |
| 4,282,049 | 8/1981 | Morse | 156/62.2 |
| 4,534,886 | 8/1985 | Kraus et al. | 252/502 |
| 4,734,231 | 3/1988 | Morita et al. | 264/45.3 |
| 4,737,618 | 4/1988 | Barbier et al. | 219/548 |
| 4,942,078 | 7/1990 | Newman et al. | 428/192 |
| 4,972,197 | 11/1990 | McCauley et al. | 343/704 |
| 5,250,228 | 10/1993 | Bairgrie et al. | 252/511 |
| 5,344,696 | 9/1994 | Hastings et al. | 428/220 |
| 5,361,183 | 11/1994 | Wiese | 361/42 |
| 5,528,249 | 6/1996 | Gafford | 343/704 |

FOREIGN PATENT DOCUMENTS

| | | |
|---|---|---|
| 0496388 | 7/1992 | European Pat. Off. . |
| 2719182 | 10/1995 | France . |
| 9515670 | 6/1995 | WIPO . |

*Primary Examiner*—J. Woodrow Eldred
*Attorney, Agent, or Firm*—White & Case LLP

[57] ABSTRACT

The invention relates to heatable wind energy turbine blades and to a method of heating and deicing the turbine blades using conductive fabrics to displace and/or cease the buildup of ice on the turbine blades by electrothermal fabric heater disposed or integrated on the turbines for effectively deicing the blades. Multiple turbine blade design methods are explored as well as heater materials and the application of such materials.

15 Claims, 7 Drawing Sheets

DEVICE AND METHOD FOR HEATING AND DEICING WIND ENERGY TURBINE BLADES

CROSS REFERENCE TO RELATED APPLICATION

This application claims the benefit under 35 U.S.C. § 119(e) of U.S. Provisional Patent Application No. 60/047,237 filed on May 20, 1997.

TECHNICAL FIELD OF THE INVENTION

The invention concerns heatable wind energy turbines blades and a method for heating and deicing the turbine blades. The turbine blades comprise a composite having incorporated therein fabric heaters that generate thermal energy for deicing the surface of the blades. The method of the invention comprises disposing the fabric heaters in or on the surface of the turbine blades, and energizing the heaters to melt ice and shed ice deposits from the turbine blades.

BACKGROUND OF THE INVENTION

Wind energy turbines generate their electrical power from the wind. This power generation occurs when the wind is within certain operational speed limits. Because atmospheric conditions create wind, in icing conditions wind energy turbines could operate at one hundred percent of their operational limits, if it were not for ice accumulation. As such, the turbine's efficiency to produce electrical energy is compromised when ice builds up on the turbine blades.

Unlike other forms of energy production, wind energy is free from waste, provides little environmental impact, exhibits low maintenance costs and offers scaleable capital expenditures. This scaling of wind energy production occurs in the number of units and over a number of different sized units. As few as one device can be installed for local production or as many as hundreds, or thousands installed, creating what is known as a wind farm. Moreover, it has been observed that certain localities offer consistent prevailing winds, making energy production and its management even more cost effective. Unfortunately, while some proportion of existing farm sites are hindered by icing, further candidate sites for wind farms are neglected due to their adverse icing environment. Thus, the ability for an area to sustain winds is not enough. It must be relatively ice free.

Icing has several negative characteristics that affect wind energy production. Blades for wind generation are designed and constructed to the highest level of expertise to provide the maximum transfer efficiency of wind to rotational energy and finally electrical energy. When icing conditions occur, ice accumulates on the blade surfaces, changing the aerodynamic profile, and reducing its efficiency. Furthermore, different forms of ice can have different affects. Some types of ice severely increase aerodynamic drag while adding little weight. This form of accumulation results in less production efficiency as the accumulation continues. At some point, the quantity of ice or its cumulative effect can stall the blades altogether ceasing rotation and electrical energy production. Other forms of icing add weight with less aerodynamic penalty. Increases in weight provide more strain on equipment, thus high maintenance costs. With accumulation of ice, dangers exist when the ice sheds from the rotating blades in an uncontrolled manner. Shedding ice can create hazardous asymmetric loads on all or part of the equipment and destroy the structure. Additionally, shedding of larger pieces can destroy neighboring structures.

During seasonal periods, atmospheric ice conditions exist that render wind energy turbines inefficient and dangerous to operate. Icing conditions are an atmospheric phenomenon that produce airborne water in near freezing, frozen and supercooled-unfrozen forms. Combating ice accumulation can be accomplished by electrothermal means. Until now, electrothermal heating and deicing/anti-icing of wind energy turbine blades has been accomplished by electrical heating elements manufactured from various types of wire and foils. This method of heating the turbine blades is ineffective, suffering from thermal and mechanical fatigue, thereby limiting their life-span. Thus, new and improved methods for heating wind energy turbine blades are needed, which would generate even distribution of heat for more efficiently removing ice accretions and which would improve the fatigue life over wire and foil heaters so as to increase the operating environmental window and life expectancy of the blades.

Conductive fabrics have been used in deicing and anti-icing aerospace structures. For example, U.S. Pat. No. 5,344,696 to Hastings et al. discloses an integrally bonded laminate that is used to thermally control a surface of an aircraft to which the laminate is bonded. The patent describes that the use of fabrics have numerous advantages over prior methods for deicing and heating airplane wings; for example, the conductive fiber is of low weight, and or permits nominal intrusion in terms of aerodynamics; it is easy to handle compared to wire and foil, and most notably, it allows the even distribution of heat. These factors contribute to a more efficient use of energy. Deicing and anti-icing aircraft applications necessitate an extreme in terms of product requirements. Because aircraft operate on very limited electrical resources and extreme atmospheric conditions, a system must be efficient as well as robust to provide protection. A variety of heater elements exist in the prior art.

U.S. Pat. No. 4,534,886, to Kraus et al., discloses an electrically conductive web composed of a non-woven sheet of conductive fibers and non-conductive fibers. The sheet is saturated with a dispersion containing conductive particles and is then dried. The Kraus et al. heater element is used primarily in heating pads.

International Application No. PCT/US94/13504 (Publication No. WO95/15670) discloses an electrically conductive composite heating assembly. The assembly has an electrically conductive non-woven fiber layer laminated between layers of fiberglass and other dielectric material. The assembly further has an abrasion resistant outer layer. The heater element is used on aerospace structures as an ice protection system to withstand the repeated mechanical stress and thermal cycles encountered in extremely harsh aerospace environments.

None of the prior art heater elements, however, have been applied to heat and deice the surface of wind energy turbine blades.

SUMMARY OF THE INVENTION

The invention relates to heatable wind energy turbine blades and to a method for heating and deicing the turbine blades. The turbine blades comprise a fabric heater integrally disposed within or on the blades for effectively heating and deicing the surfaces of the blades. Multiple turbine blade designs and methods are explored as well as heater materials and methods for controlling the heat output, and methods for the application of such materials. The present method for heating and deicing/anti-icing wind energy turbine blades has advantages over prior art methods in that it does not limit or reduce the operating life of the turbine blade.

In a preferred embodiment, the wind energy turbine blades are heated by a fabric layer composed of conductive fibers. In particular, the fabric layer heater can be provided to the blades either alone or as part of a laminated composite which is impermeable to water.

The invention also relates to a method for heating the wind energy turbine blades. The method comprises incorporating or disposing a fabric layer composed of conductive fibers or fabric heater alone, or in the form of a laminate composite on or into the blades of the turbines, so that when the conductive fibers of the fabric heater elements are energized, the heat produced is evenly distributed on the blades' surfaces, thereby melting the interface bond so ice accretion sheds in controlled manner.

The fabric heaters can be incorporated into the design of wind energy turbine blades internally, externally, or partially internal and external.

In another embodiment, the invention relates to a method for constructing or making a wind energy turbine blade.

DETAILED DESCRIPTION OF THE INVENTION

The present invention provides heatable wind energy turbine blades and methods for eating and deicing/anti-icing the turbine blades using electrically conductive fabric heater elements. The fabric heater elements may be attached to the surface of the blade, such as in the form of a boot or cap, or incorporated into the composite structure of the turbine blades.

In the present invention, electrically conductive fabrics are defined as any combination or collection of various fibers, i.e., conductive, semi-conductive and non-conductive. The fibers may be arranged in woven, non-woven, or braided forms of various fashions. The fibers may be electrically conductive natural fibers, electrically conductive man-made fibers, semi-conductive natural fibers, semi-conductive man-made fibers, non-conductive natural fibers, and non-conductive man-made fibers. Any of the fibers may be coated with conductive, semi-conductive, or non-conductive materials. Furthermore, non-woven fabrics may be engineered to contain various fibers of various lengths and orientation. In addition to standard mill fibers, a hybrid fabric may be constructed from otherwise electrically non-conductive fibers through a process known as carbonization. The carbonization process converts polymers of hydrocarbons into conductive carbon strands by exposing them to high temperature. Examples of these fibers are carbon and or metal-coated carbon fibers.

Coating of fibers provides designers with additional variables of specific heat capacity, electrical resistance, corrosion inhibition, and stress coefficients. Coatings need not be conductive at the time of fiber construction providing the fiber itself is conductive, or is part of a hybrid system as discussed later. Fiber types may be chosen due to properties known in the art to which they are intended. Finished fibers can be combined to promote a compromise or take advantage of strengths found in each. Each fiber type, and combination thereof, once combined form a fabric. Each fabric has characteristics unto itself that would be well suited, or not, for use as an electrothermal heater element. One such material well suited for general applications is non-woven-nickel-coated carbon fiber (NCCF), known in prior art as THERMION and described in U.S. Pat. No. 5,344,696.

A heater element is defined as the base component generating or otherwise dissipating heat by actions of energy input. Energy in this example is in the form of electrical current acting on a resistive load (the heater element). A "heater" in general terms is classified to include all encasements of a heater element useful for the intended purpose. One such example of a heater is an element laminated between two dielectric materials with the necessary electrical connections exposed (FIG. 1 in which the electrical connections are not shown).

To design a fabric heater system basic understanding of electrical engineering is necessary, including Ohm's Law and circuit design. In addition, a thorough understanding of the electrical properties is necessary for each fabric used. In a preferred embodiment, the conductive fabrics, in an ideal form, behave in a manner described by the following equations:

$$R = \frac{\rho}{n}\left(\frac{L_F}{W_F}\right)$$

where
R—Resistance (ohms)
$\rho$—surface resistivity (ohms/square)
$L_F$—Fabric Length
$W_F$—Fabric Width
n—number of conductive layers and $$\delta = \frac{V^2}{R}\left(\frac{1}{L_F W_F}\right)$$

where
$\delta$—Power Density (Watts/heated area)
V—Applied Voltage (volts) and
R, $L_F$, and $W_F$ are as defined above Herein, the ideal Resistance of a design is derived from the fabric's Surface Resistivity and layer arrangement, while the ideal Power Density, the electrothermal value from which deicing ability is based, can be provided by modification of the heater geometry or the applied Voltage.

Fabrics do, of course, deviate from the ideal. They can have "Electrical Bias," the electrical resistance of a square of fabric is not equivalent when measured across the two dimensions (length versus width). Some materials can also exhibit capacitive reactance, inductive reactance or some measure of each. Inductive reactance is understood and encountered quite often in the art. Capacitive reactance, especially within what is otherwise deceptively simple fabric, is not widely known or understood. A fabric that exhibits capacitive reactance will draw more current when exposed to higher frequencies signals. For instance, a particular heater may draw one (1) ampere when connected to a direct current (DC) power source, while drawing one and one half (1.5) amperes under the same rms voltage using an alternating current (AC) power source, at approximately 60 Hertz. The heater will continue to draw higher currents as the frequency of the alternations rise. This behavior may be represented by the equation:

$$1. \quad I = \frac{V}{\sqrt{\left(\frac{\rho}{n}\frac{L_F}{W_F}\right)^2 + \left(\frac{1}{2\pi f C}\right)^2}}$$

where

I Current (amperes)

V Applied Voltage (volts)

ρSurface Resistivity (ohms/square)

$L_F$ Fabric Length (inches)

$W_F$ Fabric Width ((inches)

πConstant (3.14159 . . . )

ƒ Frequency (hertz)

C Capacitance (farads)

n number of conductive layers derived from the basic equation of impedance given $X_L$=0:

2. $Z^2 = R^2 + (X_L - X_C)^2$ where

Z Impedance (ohms)

R Resistance (ohms)

$X_L$ Inductive Reactance (ohms)

$X_C$ Capacitive Reactance (ohms)

In most applications the effect of frequency will bare little weight on the design. To determine the fabric's capacitance, one must determine from experiment the value of several constants. These constants will generate a baseline from which the area and layer count will determine the net capacitance. To do so one must make several baseline assumptions. These assumptions are indicative of the fabric under study. One example, Thermion, could be evaluated in the following manner: The capacitance of a device, assuming it is similar to a very large parallel plate capacitor where edge effects are minor, can be derived from the following equation:

$$3. \quad C = \kappa \frac{\varepsilon_o l w}{d_s}$$

where

K—dielectric constant $E_a$—permittivity constant l—Plate Length w—Plate Width $d_s$—Separation Distance the permittivity constant is known to be (8.85×10⁻¹² Farads/ Meter), while the plate length and width are defined as the fabric dimensions. Separation distance is arbitrarily set to one half the nominal fabric thickness $d_s$=t/2.

This constant can be further evaluated but adds little additional detail to the equation and will only result in a statistical value. Applying these points, the equation becomes:

$$4. \quad C = 2k\frac{\varepsilon_o L_F W_F}{\tau}$$

where τ – Fabric Thickness

Substituting this back into Equation 1:

$$(5) \quad I = \frac{V}{\sqrt{\left(\frac{\rho}{n}\frac{L_F}{W_F}\right)^2 + \frac{1}{2}\left(\frac{\tau}{\pi\varepsilon_o \kappa f L_F W_F}\right)^2}}$$

where

I, V, ρ, $L_F$, $W_F$, n, $\epsilon_o$, k, f, π and τ are as defined above.

For a given sample of fabric, if the current is mapped in relation to the change in frequency, and the resistance is determined by accepted methods, the dielectric constant can be discovered for the particular fabric. Although the inductive reactance has been omitted from this evaluation, it follows that as the frequency rises the current would diminish. Fabrics having both inductive and capacitive reactance would exhibit a peak current at the point of resonance. This resonance, as known in the field of electrical engineering, is the exact frequency when inductive and capacitive reactance are equivalent. The careful study of each fabric does give the designer a firm understanding of its behavior under multiple circumstances.

Currently, the majority of turbine blades are manufactured from liquid resins and fiberglass applied to molds bearing the surface contours desired. In most of these cases the blade is molded in separated halves, divided down the leading and trailing edges. Once both mold sections are cured and prepared they are bonded together and dressed for shipping. Although blade requirements necessitate considerable design, these structures are far less complex in their manufacture and material specifications when compared to aerospace components. Even so, some tendencies exist to progress the design of wind energy turbine blades into the realm of aerospace engineered materials and practices to bring about some benefits. Aerospace materials, although more costly, are often considerably stronger while exhibiting less weight penalty.

Fabric heaters can be incorporated into the designs of wind energy turbine blades in several fashions. In the broadest understanding and preferred embodiment, the fabric heaters can be incorporated into the turbine blades by two techniques, i.e., internal and external applications.

Figure 2:
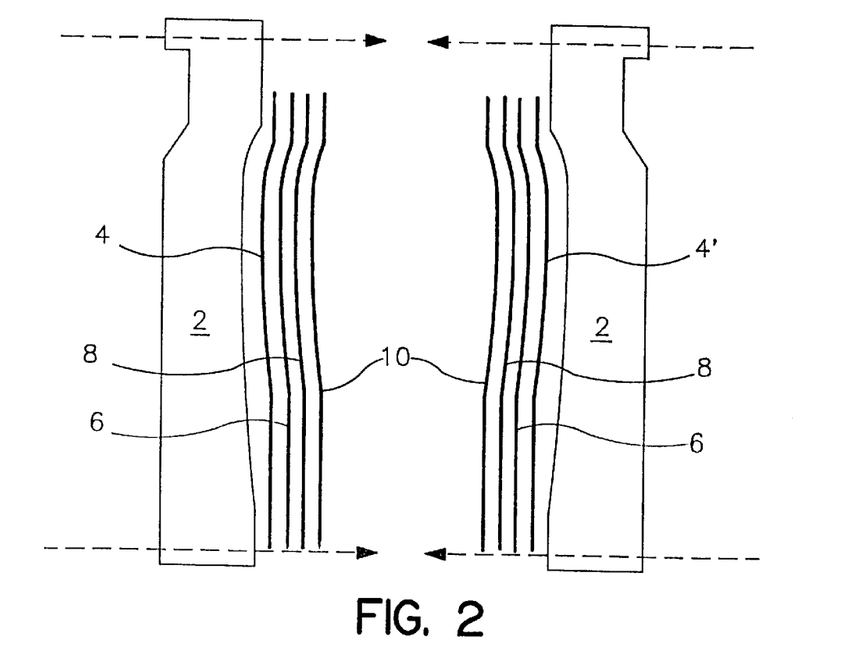
FIG. 2 illustrates a split mold blade design of the invention showing the component layers of a turbine blade.
Figure 3:
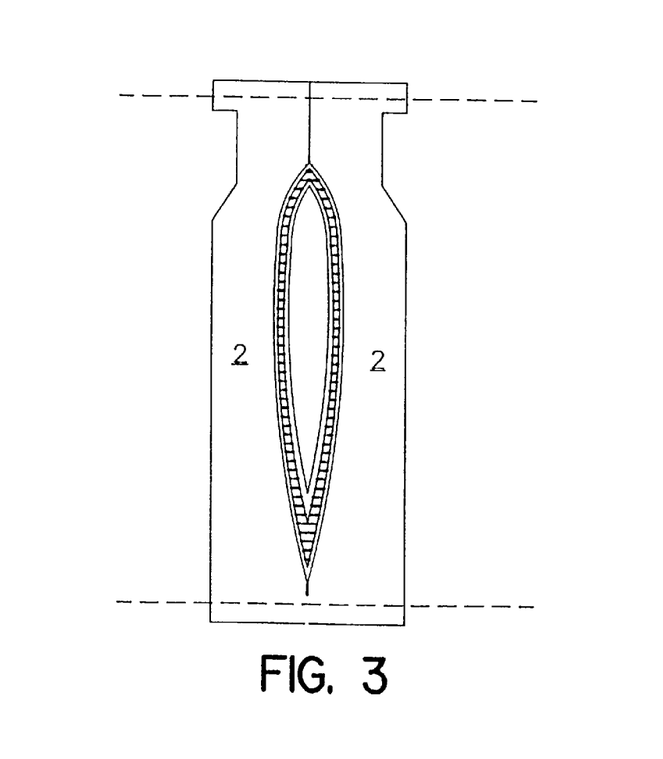
FIG. 3 illustrates a split mold blade design of the invention forming a turbine blade.

In another embodiment, for many blade designs the fabric heater may be incorporated as a hybrid, i.e., an internal/ external approach. In this embodiment, the system would be for a split mold blade design as illustrated in FIGS. 2 and 3. The split mold concept is constructed using gel coat, fiberglass, and resins as the primary composite ingredients. The present turbine blade designs can incorporate carbon fiber, kevlar, aluminum, steel and other materials and must be included in the heater system design/requirements analysis. In some instances, these materials may be intrusive to the heater, and modifications to the blade structure, heater layout or both must be considered. For example, an additional layer of conductive fabric can be incorporated and insulated from the heater, for the purpose of ground fault protection.

As shown in FIG. 2, in the construction of a turbine blade halves 3, the gel coat 4 is generally applied as the first product layer into the mold 2 prior to the heater element 6. Once completed, this will be the blade's outermost layer, less any additional painting or clear coating as called for. The gel coat 4 protects the composite, including the heater 6, from UV aging, erosion, and moisture absorption. After the gel coat is applied, resin is laid in a thin scrim to aide the placement of the heater. The heating element 6 would then be laid on the mold 2. Remaining blade layers, such as a ground fault layer 8 or an insulating layer 8, and structural layers 10 are added thereafter. At this time, and within the two half-sections the heaters that are incorporated make up the pressure and suction surface heaters. Leading edge parting strips are added after the blade halves are bonded together.

Figure 1:
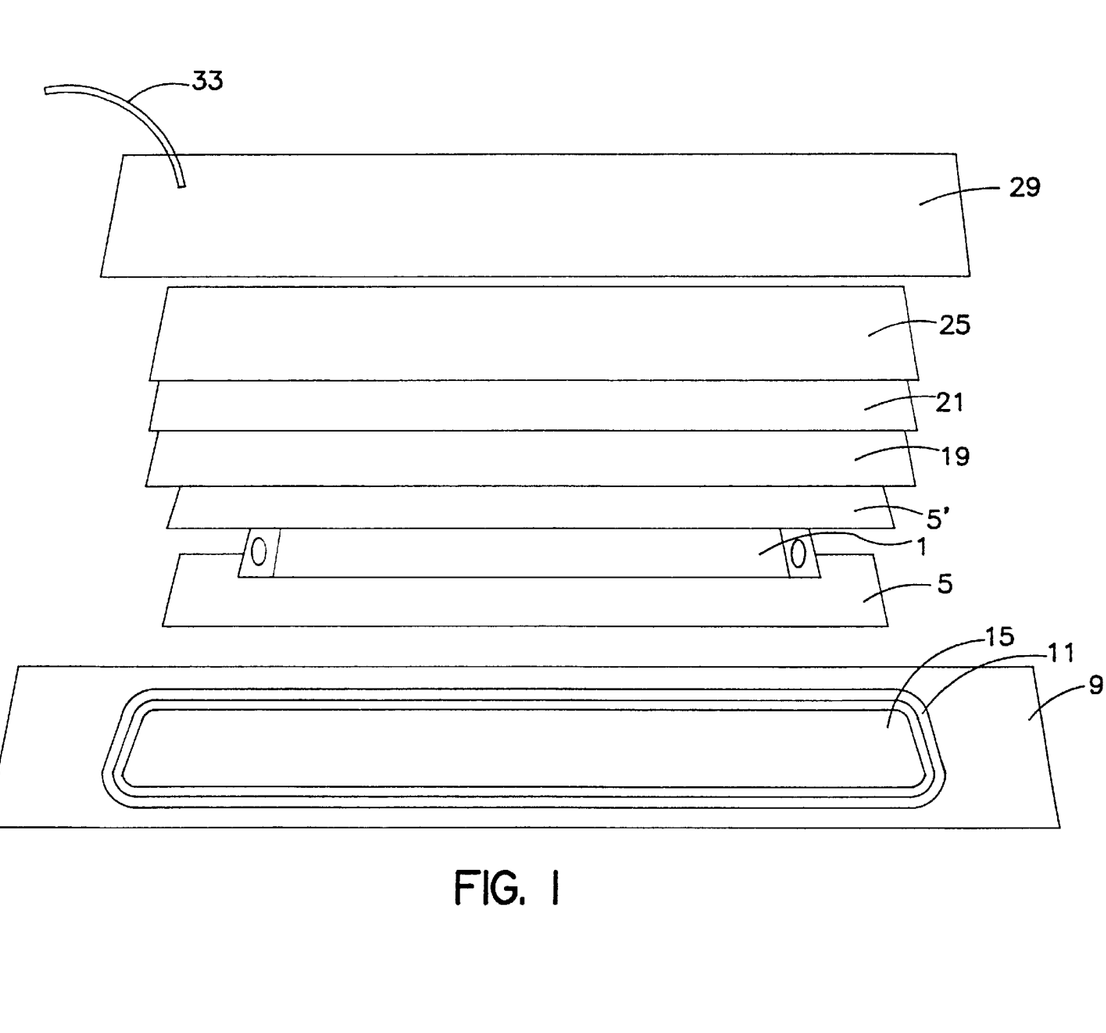
FIG. 1 shows the component layers of a laminated composite fabric heater element used in the invention.

Prior to, and in anticipation of the heater installation process, the fabric heater element is prepared, such as in the form of a laminate composite as shown in FIG. 1. The NCCF is cut to desired lengths, electrical bus materials are applied, and points of electromechanical termination are added. Zones as well as parting strips are manufactured in groups to the required complexity.

Figure 4:
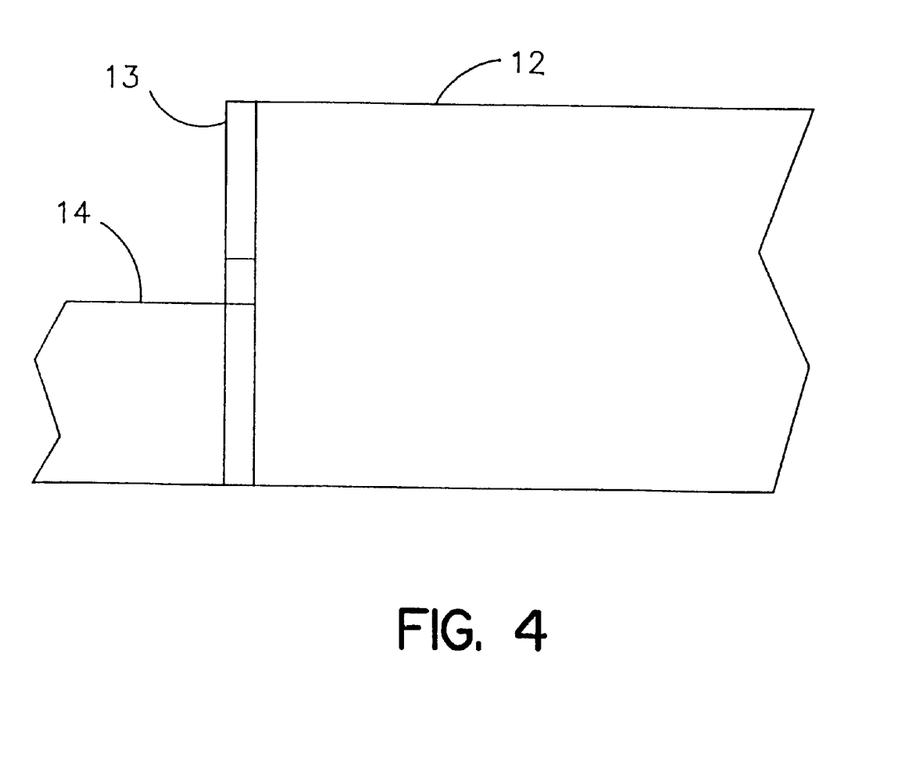
FIG. 4 shows a schematic representation of a shared bus system of the invention.

Cutting fabric requires experience in the art of composites. For instance, one long cut of fabric is used to define multiple zones. The zones are defined by bisecting the length of fabric at the appropriate places with the electrical bus. As an example shown in FIG. 6, a three zone system of 10 inches per zone and a bus of 1 inch wide requires a fabric of 34 inches in length. The electrical busses would be placed at intervals (0, 11", 22") on the fabric. If the zones are of different width the fabric is cut to the outline of the overall shape. In FIG. 4, each terminating point of each zone 12, 14 has electrical busses as described above, with one exception. For two adjoining zones of differing width, the shared bus 13 would equal the widest zone as shown in FIG. 4.

In the present invention, the electrical busses of some low resistance material, such as beryllium-copper alloy strip are preferred and are attached to the fabric as mentioned or in some design as to establish the heated area. One preferred method is to bond the fabric and beryllium-copper alloy strip together with a conductive epoxy. In a similar fashion, an electrical connection is established to the heater busses. To facilitate the addition of consecutive layers of materials behind the fabric heater during the construction, the electromechanical connection may be constructed from a barb or spike 15 in FIG. 5. The spike 15 would be bonded to the heater bus bar and protrude inwards away from the mold 2 surface. As fabric is laid over the spike, it is pressed down exposing the point and separating the fibers.

Figure 5:
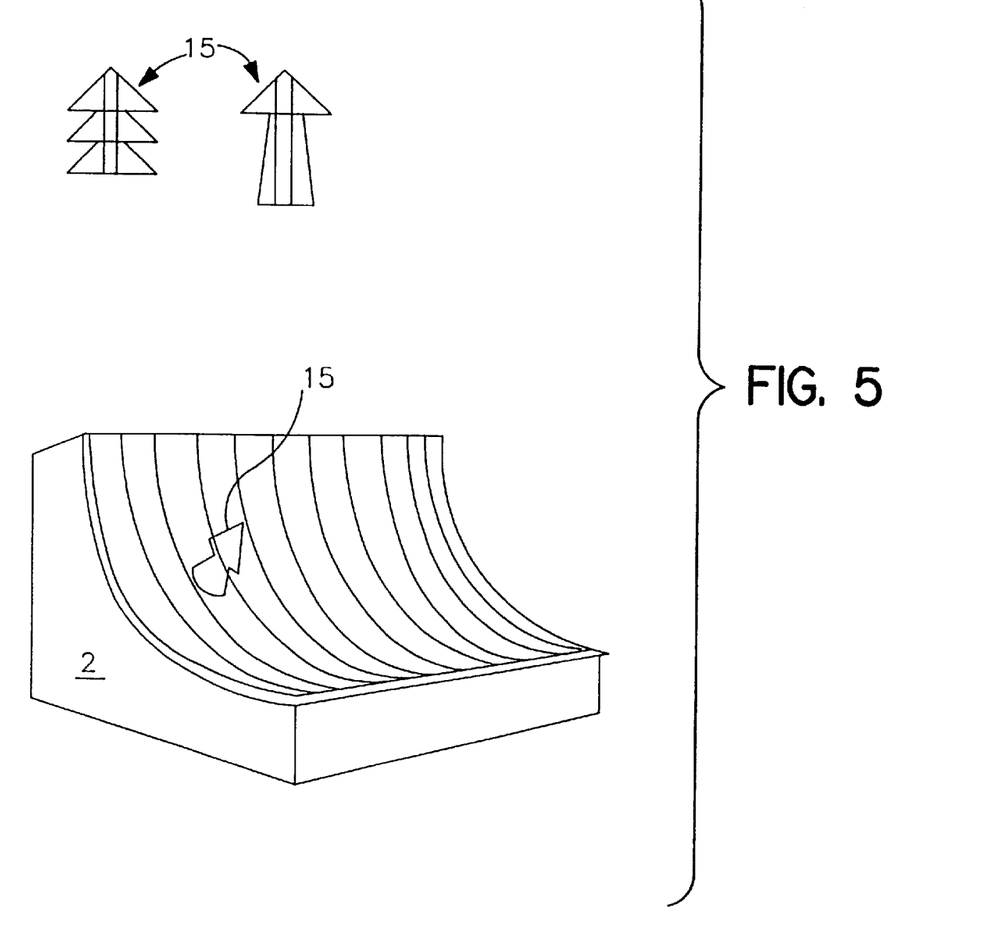
FIG. 5 depicts an electromechanical connection of the invention using a barb or spike.

In this aspect of the invention, through each layer the spike 15 will continue until the last cycle of resin and cloth is applied, at which time the spike is cleaned and the power wire attached. The barbed spike has several features that make it superior to other methods: 1) allows easy construction; 2) indicates the electrical connection for easy completion of the wiring; 3) resists pull-out and movement after the blade is completed; 4) eliminates drilling of the structure, destroying the homogeneity of the composite; and 5) pre seals the hole, eliminating the entrapment of air which would weaken the structure. To provide for the electrical connection of parting strips, the spikes for these heaters are attached to the mould as well. These spikes, however are placed prior to gel coating and in a manner to facilitate their access on the surface after the blade is removed from the mould.

Figure 6:
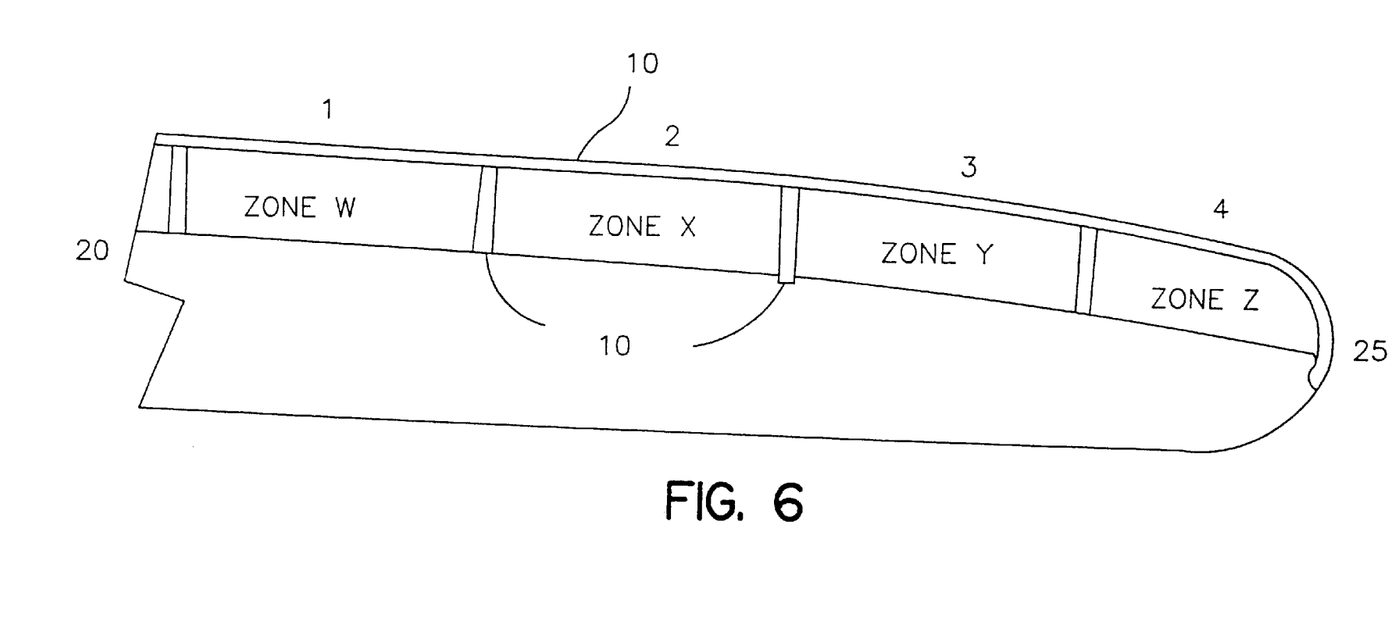
FIG. 6 depicts a schematic representation of a wind energy turbine blade showing the location of zone fabric heater elements within the blade.

In a preferred embodiment, the heatable turbine blades contain zone heaters 1, 2, 3 and 4 as illustrated in FIG. 6.

However, the number of heaters used per blade depends on the factors such as blade size, environment type, zone dimension, and control sequencing. After the zone heaters are installed, and parting strip spikes 10 are applied, additional layers of materials, including the ground fault layer of conductive fibers are built-up in accordance with composite construction practices. These layers can be a combination of fabrics and fibers to achieve the designer's goal. Layers are wetted in and after the final material is in place the blade is allowed to cure.

Figure 8:
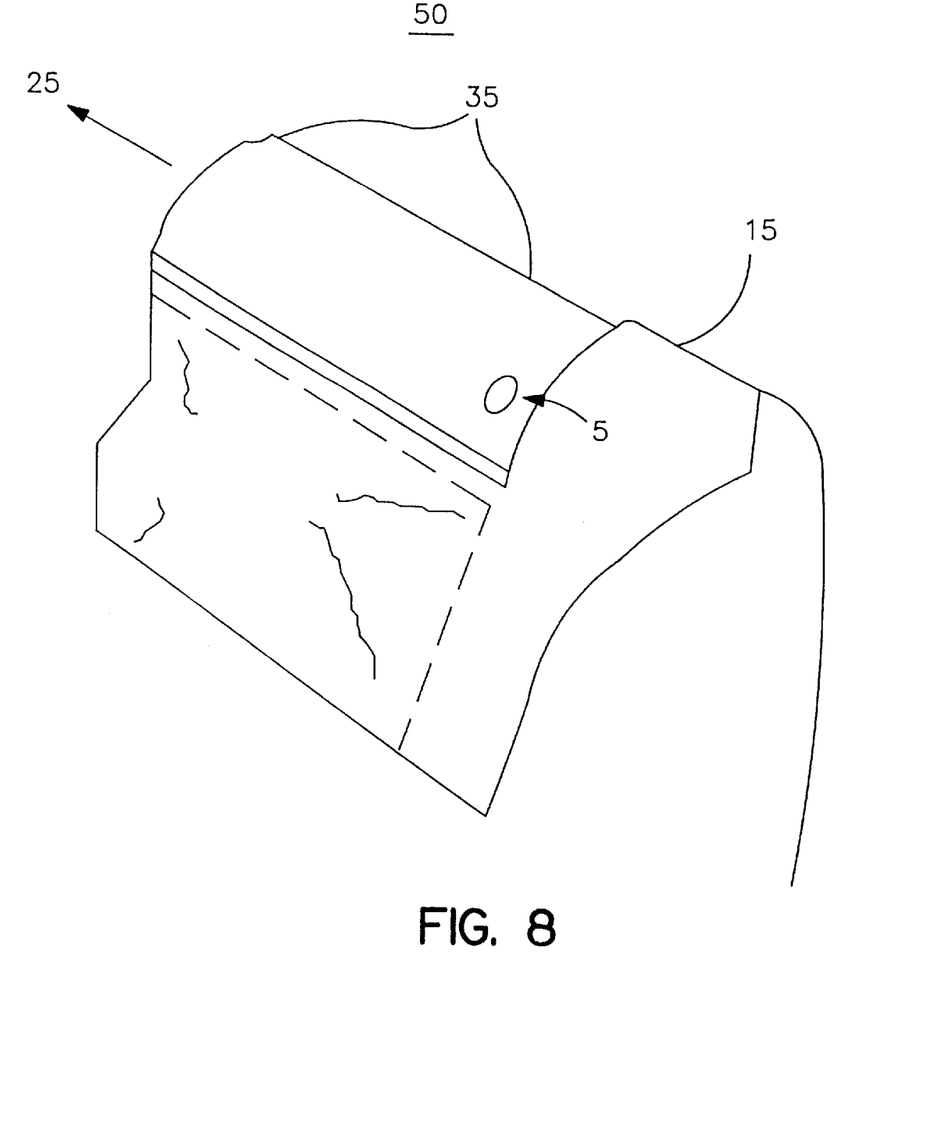
FIG. 8 is a schematic representation of a prepared leading edge of a heatable wind energy turbine blade of the invention.

In this aspect of the invention, preparing the two halves for mating requires the bond lines to be dressed and the blades set in an alignment fixture. Once bonded together and cured, the parting strips 10 as shown in FIG. 6, and thus the hybrid portion of the design, can be added to the prepared area 35 as shown in FIG. 8, from the hub toward the blade tip 25. Because the parting strip spikes are already included in the blade sections, they must be cleaned and bonded to the parting strip electrical busses. The parting strip heaters are then laminated in and gel coated over. The final process is to dress the entire bond line and finish the blade. The essential steps of the method of the present invention can be performed in several different ways.

The preferred parting strip heater of the present invention is a laminated composite, impermeable to water, and is of the type disclosed in U.S. Pat. No. 5,344,696 to Hastings et al., the disclosure of which is incorporated herein by reference. As disclosed in Hastings et al., the heater element comprises a durable outer ply that is resistant to abrasion and impermeable to water. For this embodiment gel coat may be this layer. The outer ply is bonded to and through a conductive layer of fibers and an integrally enveloping adhesive, which is attached to the surface of a blade. The conductive layer is connected to a source of electrical energy, and control means are adapted to control the temperature of the surface of the blade.

The preferred fabric heater element should possess certain characteristics so that the heater element can efficiently heat the surface of the turbine blades, such as quick heating and even distribution of heat. For example, the conductive fiber material should be light weight, produce even heating, have a minimal thickness, and possess low thermal inertia. A conductive material having low thermal inertia heats up and cools down quickly when the power is turned on and off, respectively. The quickness in heating and cooling facilitates greater control over the distribution of heat generated by the element. In a preferred embodiment, the conductive fiber material is approximately 0.022 ounces per square foot in weight and has a thickness of approximately 0.004 inch. A preferred fabric heater for use with the methods of the invention is available under the trademark THERMION which is manufactured by Thermion Systems International. THERMION is light, flexible and may be translucent. This particular heater element is composed of a hybrid, nickel-coated, carbon fiber processed by current textile art into a thin, conductive, non-woven fabric. The material is a laminate that provides even heating and can be conformed to surfaces having a variety of different contours and shapes. Operational power can be derived from low or high voltage AC or DC power supplies.

As discussed above, the heater element may comprise a layer of conductive fibers that are directly embedded into the material. However, in this instance, the material must possess sufficient dielectric properties to protect persons and property from electrical shock and to distribute the heat generated by the fibers evenly to the surface of the blade. Thermoplastic and thermoset materials typically possess these properties.

The preferred leading edge parting strip heater of the present invention is laminated to the leading edge of the turbine blade in a manner similar to that disclosed in the Hastings et al. patent. The heater comprises a durable outer ply bonded to the heater that is resistant to abrasion, and impermeable to water. In this embodiment, the heater is modified by having a gel coat as the preferred layer. The parting strip heater is constructed either on the blade or on a transfer table. Both methods rely on composite construction techniques outlined in FIG. 1. The preferred method of construction of the heater of the invention is directly on the blade 50, wherein electrical busses (not shown) are attached by conductive epoxy to the parting strip spine 5 in FIG. 8. Conductive fabric is attached to the bus using conductive epoxy, and allowed to cure before the remaining lamination layers and processes are performed.

As seen in FIG. 1 and with the exception of release plies 15, composite construction is as follows. Layer 5 may be necessary if dielectric separation between the heater element 1 and the blade bonding surface is necessary. Peel Ply 19 is placed above the heater 1, adhesive 5 and dielectric 5'. Release Ply 21, bleeder/breather cloth 25 and vacuum bag 29 cover the laminate and are sealed by Tape 11. Vacuum pressure is applied as well as heat in an autoclave or oven, if required.

In the methods of the invention, the heater element is disposed at a predetermined location and depth in the material. The depth and location may vary according to the particular material, type of heating required and design concept accepted.

The manner in which ice shedding occurs is critical. Heater configurations, controller placement, and control paradigms must be configured in parallel to minimize ice accumulation and maximize shedding efficiency. The maintenance of dynamic balance on the turbine is a primary concern. In principle, the preferred method of configuration and control is addressed by zoning each blade into separately heated areas and deicing all blades using equal paradigms starting from the blade tip 25 (FIG. 6). To further enhance shedding, zones are divided by additional heaters defined as parting strips 10. The parting strips 10 segregate zones into discrete shedding plates by continuous heating, and thus defeat ice accumulation between zones. Because zones are segregated, the system can deice all zones on a blade individually (radial sets on the rotor), beginning at the tip 25, and continuing toward the hub 20 in a repeating cycle. The system design allows centripetal acceleration and aerodynamic forces to aid in the shedding of small controlled particles of ice.

To aid in zone control, secondary power distribution can be achieved by localized relays constructed within the heater laminate; especially for a replaceable heater boot. These relay, fed by address signals from the primary control system at the hub, activate by discrete signals heating simultaneous zones on similar radial bands around the turbine thereby achieving balanced shedding. To simplify control systems, primary controls such as sensors, telemetry and circuit protection can be housed on the hub within the spinner therefore minimizing the cabling required within each blade.

In conjunction with zoning, the paradigm considers the quantity of ice shed by the desecrate zones, both in area and thickness. It optimizes the accumulation of ice between cycles, but operates in such a manner as to balance the average power consumption and ice accumulation. This practice is achieved by allowing some ice to accumulate on the blades. Providing the shed ice does not become too thick, it will break up once airborne. Accumulation timing thus reduces average power consumption and operates more effectively. Lastly, to aid effectiveness, the paradigm possesses a closed loop feedback to modify performance based on the environmental operating conditions.

EXAMPLE 1

This example illustrates a preferred embodiment of the invention. It pertains to the heating of composite wind energy turbine blades of all design types using electrically conductive fibers. One general design is seen in FIG. 6. FIG. 6 is a typical turbine blade of a composite construction showing the location of zone fabric heaters, i.e., positions 1, 2, 3 and 4 denoted on the turbine blade.

Figure 7:
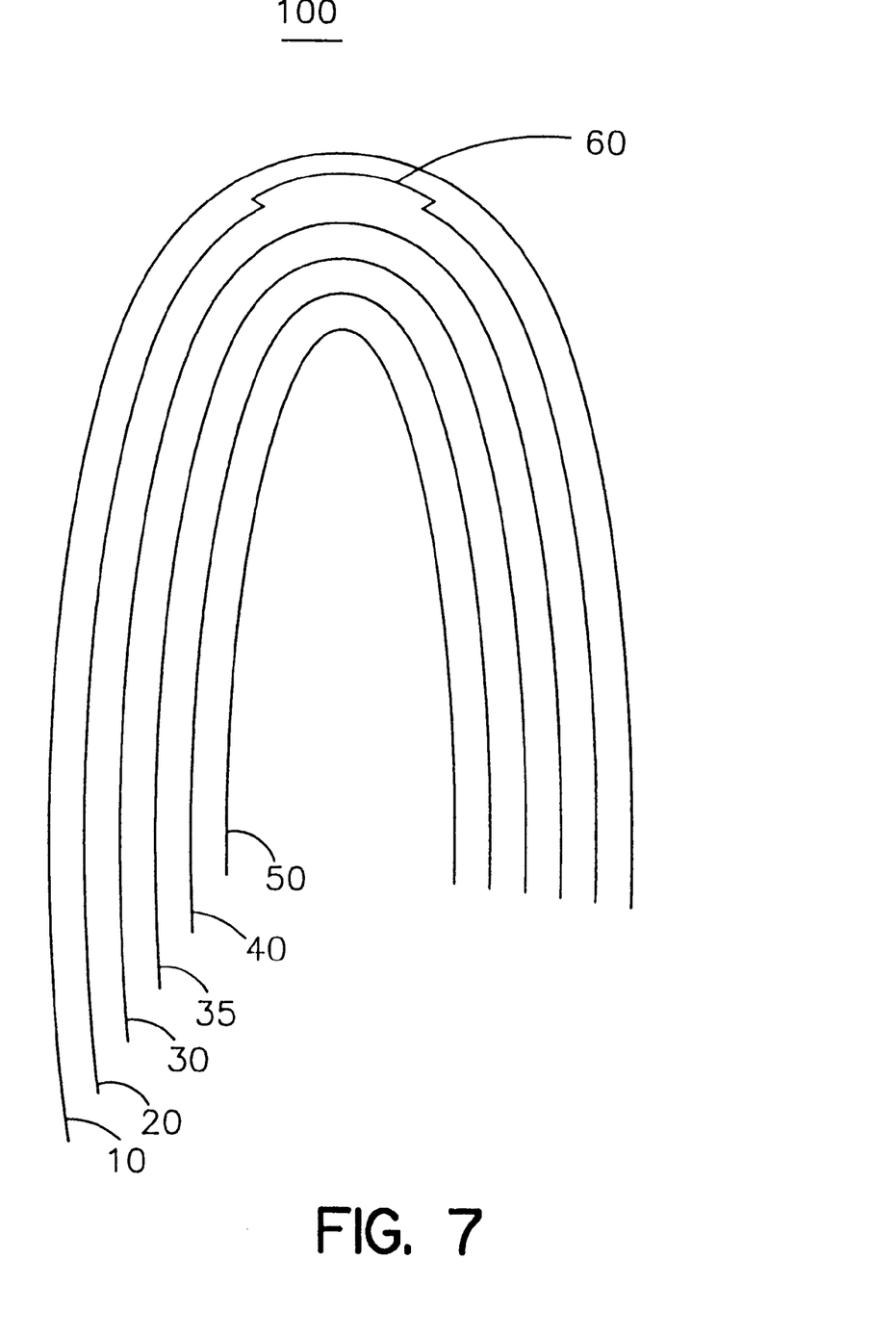
FIG. 7 shows a schematic representation of a cross-section of a wind energy turbine blade showing the component layers.

FIG. 7 shows a cross-section of a blade design such as that shown in FIG. 6, incorporating THERMION as the conductive fiber layer 20, wherein the heater is disposed on the surface of the turbine blade 100. The THERMION heater element 20 is incorporated into the turbine blade laminated composite and is separated from the environment by a gel coat layer 10. The Thermion heater element 20, bonded to the outer layer 10, is closely opposed to any conductive structural component or a ground fault layer 35 by the dielectric layer 30. Structural layers 40, 50, are built up as necessary behind the heater element 20. The dielectric layer 30 may be optionally integrated into the turbine blade.

The fabric heater element 20 is connected by wire and/or conductive ribbon to a suitable electric source (not shown), which provides the electrical power to heat the surface of the turbine blade. The power may be controlled by a simple on/off switch or by a more complex temperature/power controller that measures and monitors a number of parameters, including the atmospheric conditions in the vicinity of the turbine and the surface temperature of the blade. Controllers that accomplish these tasks are known by those skilled in the art.

Power requirements depend on the amount of heat needed, the size of the blade, and the available power supply. Wires and cables meet at a central controller housing on the turbine and provide the necessary timing and temperature response signals to the source of electrical power.

What is claimed is:

1. A method for heating the surface of a wind energy turbine blade comprising:

providing a pre-formed fabric heater element consisting of an inner layer composed of a fabric of electrically conductive fibers laminated between two fiberglass/resin layers; two outer layers of dielectric material disposed on opposing surfaces of said inner layer and encapsulating said inner layer, and electrical leads connected to said conductive fibers and adapted to receive power from a power source;

disposing the pre-formed fabric heater element at a predetermined location within or on the surface of the blade, and energizing the electrically conductive fibers of the pre-formed fabric heater element to distribute heat evenly on the surface of the blade, thereby deicing or preventing ice build-up on the blade.

2. The method of claim 1, wherein the conductive fibers are man-made metal-coated carbon fibers.

3. The method of claim 2, wherein the carbon fibers are coated with nickel.

4. The method of claim 1, wherein the conductive fibers are provided to the blade in the form of a boot.

5. The method of claim 1, further comprising providing primary controls to the turbine blade to regulate heat output on the surface of the blade.

6. The method of claim 5, wherein the turbine blade comprises a hub and a blade spinner and the primary controls are provided in the hub of the turbine blade, within the blade spinner.

7. The method of claim 1, wherein the pre-formed fabric heater element is provided as a plurality of zone heaters.

8. The method of claim 7, further comprising providing secondary addressable controls to the zone heaters of the turbine blades to provide discrete signals for activating the zone heaters simultaneously, thereby heating the blade and achieving balanced shedding of ice.

9. The method of claim 1, further comprising disposing a ground fault layer on the turbine blade.

10. A heatable wind energy turbine, comprising a plurality of blades and fabric heaters and a means for connecting the fabric heaters to a power source; said fabric heaters being integrally disposed on said blades for providing heat evenly on the surface of the blades, and wherein each fabric heater comprises a pre-formed fabric heater element consisting of an inner layer composed of a fabric of electrically conductive fibers laminated between two fiberglass/resin layers; two outer layers of dielectric material disposed on opposing surfaces of said inner layer and encapsulating said inner layer, and electrical leads connected to said conductive fibers and adapted to receive power from a power source.

11. The method of claim 1, wherein the conductive fibers are provided in the form of a cap.

12. The method of claim 1, wherein the pre-formed fabric heater element further comprises spikes.

13. The method of claim 7, wherein the pre-formed fabric heater element further comprises parting strips.

14. The method of claim 1, wherein the pre-formed fabric heater element further comprises a gel coat.

15. The method of claim 1, wherein the pre-formed fabric heater element is provided to the blade as a hybrid system.

* * * * *